United States Patent
Nagpal et al.

(10) Patent No.: US 11,907,506 B1
(45) Date of Patent: Feb. 20, 2024

(54) SYSTEMS AND METHODS FOR IDENTIFYING AN ACTIVE SPEAKER IN A VIRTUAL MEETING

(71) Applicant: Verizon Patent and Licensing Inc., Basking Ridge, NJ (US)

(72) Inventors: Ashish Nagpal, Karnataka (IN); Krish Ramakrishnan, Saratoga, CA (US); Satya Prakash Pati, Bangalore (IN); Mahabaleshwar Bhat, Cupertino, CA (US); Jaimin N Pancholi, Karnataka (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/881,287

(22) Filed: Aug. 4, 2022

(51) Int. Cl.
| | |
|---|---|
| *G06F 3/048* | (2013.01) |
| *G06F 3/0484* | (2022.01) |
| *G06T 11/00* | (2006.01) |
| *G10L 25/78* | (2013.01) |
| *G06K 7/14* | (2006.01) |
| *G06Q 10/1093* | (2023.01) |
| *G10L 25/57* | (2013.01) |

(52) U.S. Cl.
CPC ......... *G06F 3/0484* (2013.01); *G06K 7/1417* (2013.01); *G06Q 10/1095* (2013.01); *G06T 11/00* (2013.01); *G10L 25/57* (2013.01); *G10L 25/78* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 7,313,593 B1 * | 12/2007 | Pulito | G06Q 10/10 709/227 |
| 2010/0020951 A1 * | 1/2010 | Basart | H04M 1/575 379/142.01 |

* cited by examiner

Primary Examiner — William C Trapanese

(57) ABSTRACT

An illustrative virtual meeting management system associates a user device of a participant of a virtual meeting with a physical location from which the participant and one or more additional participants participate in the virtual meeting. The virtual meeting management system determines that the participant provides a user input via the user device during the virtual meeting. The user input indicates that the participant will speak. Based on the user input and the associating, the virtual meeting management system provides an active speaker indicator for presentation in a virtual meeting interface provided to one or more participants of the virtual meeting. The active speaker indicator specifies a participant identifier representative of the participant and a place identifier representative of the physical location from which the participant participates in the virtual meeting. Corresponding methods and systems are also disclosed.

20 Claims, 8 Drawing Sheets

SYSTEMS AND METHODS FOR IDENTIFYING AN ACTIVE SPEAKER IN A VIRTUAL MEETING

BACKGROUND INFORMATION

A virtual meeting may include a plurality of participants who participate in the virtual meeting together from a same physical meeting space (e.g., a conference room of an organization) and one or more participants who separately participate in the virtual meeting from their locations (e.g., a home of an employee of the organization) that are remote from the physical meeting space.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF EXAMPLE EMBODIMENTS

Figure 1:
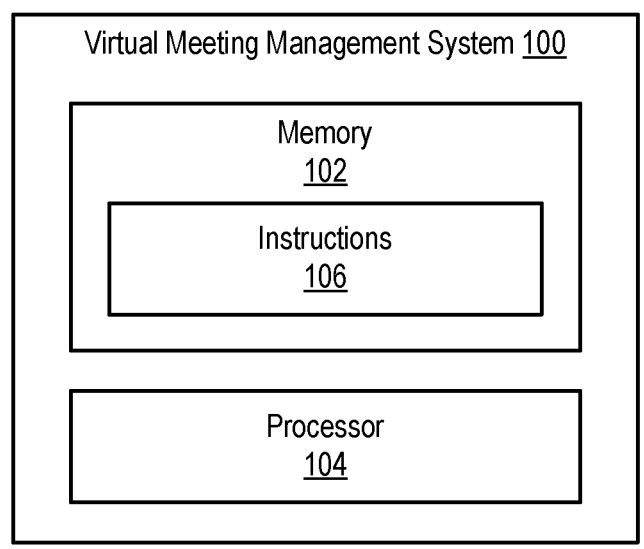
FIG. 1 shows an illustrative virtual meeting management system according to embodiments described herein.

Systems and methods for identifying an active speaker in a virtual meeting are described herein. In some embodiments, a virtual meeting may be a meeting, such as an online meeting, in which participants may electronically participate from various locations via electronic devices. During the virtual meeting, the participants may communicate and interact with one another via audio, video, textual messages (e.g., chat), and/or content sharing (e.g., screen share).

In traditional video conference systems, each participant who separately participates in the virtual meeting may be represented individually with a separate video window in a virtual meeting interface of the virtual meeting. On the other hand, the plurality of participants in the physical meeting space may be represented as a group with one video window corresponding to the physical meeting space in the virtual meeting interface. Accordingly, when a particular participant in the physical meeting space speaks during the virtual meeting, these systems may highlight the video window corresponding to the physical meeting space as a whole, without identifying the particular participant in the physical meeting space as an active speaker.

In some embodiments of the present disclosure, the virtual meeting may include a group of participants who participate in the virtual meeting together from a same physical location (e.g., an on-site conference room, etc.). These participants may be associated with the physical location and may be referred to as group participants of the virtual meeting. In some embodiments, the virtual meeting may include different groups of participants who participate in the virtual meeting from different physical locations. For example, the virtual meeting may include multiple groups of participants and each group of participants may participate in the virtual meeting from a different conference room located in a different geographical area.

In some embodiments, the virtual meeting may also include one or more participants who participate in the virtual meeting from a location separate from each other (e.g., an on-site personal office of the participant, a home of the participant, etc.) with no other participants of the virtual meeting present at the separate location with the participant during the virtual meeting. Each of these participants of the virtual meeting may be referred to as an individual participant.

In some embodiments, each individual participant of the virtual meeting may be individually represented with a video-and-audio stream of the individual participant in a virtual meeting interface of the virtual meeting. On the other hand, multiple group participants who participate in the virtual meeting together from a physical location (e.g., a conference room) may be commonly represented with a video-and-audio stream of the physical location in the virtual meeting interface. To identify the group participants present at the physical location, the participants located remotely from the physical location may attempt to recognize each group participant among multiple group participants depicted in the video-and-audio stream of the physical location. Thus, the group participants at the physical location may be identified in an inconvenient manner and potentially with low accuracy.

In addition, when a group participant at the physical location speaks during the virtual meeting, the video-and-audio stream of the physical location may be emphasized in the virtual meeting interface. However, detecting the group participant who is speaking and recognizing that speaking participant (e.g., identifying his or her name) among multiple group participants depicted in the video-and-audio stream of the physical location may still be challenging, especially when there is a large number of group participants at the physical location. To address this issue, some virtual meeting systems may include multiple high-quality cameras provided at various positions within the physical location to capture each group participant at the physical location individually. While that implementation may facilitate the detection of the speaking participant among multiple group participants at the physical location, it may still be inconvenient or even impossible for the participants of the virtual meeting to recognize the speaking participant (e.g., by identifying his or her name).

Moreover, a group participant at the physical location may not have convenient access to an on-site conference system of the physical location during the virtual meeting, and therefore the group participant may not be able to use the on-site conference system of the physical location to electronically perform an action (e.g., sending a chat message to one or more participants) during the virtual meeting. In addition, even if the group participant may electronically perform the action using the on-site conference system, the action may still be presented in the virtual meeting interface as an action associated with the physical location and not as an action associated with the group participant (e.g., the chat message may be presented with the physical location as a sender and not with the group participant as the sender).

Systems and methods described herein are capable of identifying an active speaker at a physical location (e.g., a conference room) among multiple group participants who participate in a virtual meeting together from the physical location. Identifying the active speaker may include determining a participant identifier (e.g., a participant name) of the group participant who is speaking from the physical location during the virtual meeting.

In some embodiments, for each group participant who participates in the virtual meeting from the physical location, the systems and methods may associate a user device of the group participant with the physical location. The association between the user device of the group participant and the physical location may be maintained throughout a participation time during which the group participant participates in the virtual meeting. In some embodiments, when the association between the user device of the group participant and the physical location is created, the systems and methods may activate an association mode on the user device of the group participant. The association mode may include a user interface element (e.g., a selectable button) for the group participant to provide a user input indicating that the group participant will speak.

During the virtual meeting, the group participant may use the user interface element on the user device to provide the user input indicating that the group participant will speak and then speak in the virtual meeting. Based on the user input provided using the user device of the group participant and based on the association between the user device of the group participant and the physical location, the systems and methods may determine that the group participant is an active speaker of the virtual meeting and that the group participant participates in the virtual meeting from the physical location. Accordingly, the systems and methods may present an active speaker indicator corresponding to the group participant in a virtual meeting interface provided to one or more participants of the virtual meeting.

In some embodiments, the active speaker indicator may specify a participant identifier representative of the group participant and a place identifier representative of the physical location from which the group participant participates in the virtual meeting. For example, the active speaker indicator may include a graphical element indicating the participant identifier (e.g., a participant name) of the group participant. In some embodiments, the graphical element may be overlaid on a video-and-audio stream of the physical location that is displayed with the place identifier (e.g., a conference room name) of the physical location. Accordingly, the active speaker indicator may inform the participants of the virtual meeting about the participant identifier (e.g., the participant name) of the group participant who is speaking in the virtual meeting and the place identifier (e.g., the conference room name) of the physical location that includes the group participant.

Systems and methods described herein may be advantageous in a number of technical respects. For example, as described above, the systems and methods may enable the group participant at the physical location to use the user interface element on his or her user device to provide the user input indicating that the group participant will speak in the virtual meeting. Based on the user input and the association between the user device of the group participant and the physical location, the systems and methods may present in the virtual meeting interface the active speaker indicator specifying the participant identifier (e.g., the participant name) of the group participant and the place identifier (e.g., the conference room name) of the physical location associated with the group participant as described above. Accordingly, the participant identifier of the speaking participant and the place identifier of the physical location including the speaking participant may be accurately and conveniently presented to the participants of the virtual meeting. Thus, the need for the participants of the virtual meeting to identify the speaking participant from the video-and-audio stream of the physical location may be eliminated, and therefore user experience of the participants in the virtual meeting may be improved.

In addition, for each group participant who participates in the virtual meeting from the physical location, the systems and methods may associate a user device of the group participant with the physical location as described above. Based on the association between the user device of the group participant and the physical location, the systems and methods may present the participant identifier (e.g., the participant name) of the group participant in association with the place identifier (e.g., a conference room name) of the physical location in a participant list of the virtual meeting. Accordingly, the participants of the virtual meeting may reference the participant list and be informed of the group participants who participate in the virtual meeting from the physical location. Thus, the need for the participants of the virtual meeting to identify the group participants present at the physical location from the video-and-audio stream of the physical location may be eliminated, and therefore user experience of the participants in the virtual meeting may be improved.

Moreover, the systems and methods may enable the group participant at the physical location to electronically perform an action (e.g., sending a chat message, sharing a document, etc.) in the virtual meeting using his or her user device. Based on the user device of the group participant with which the action is performed and based on the association between the user device of the group participant and the physical location, the systems and methods may determine that the action is performed by the group participant who participates in the virtual meeting from the physical location. Accordingly, the systems and methods may present the action of the group participant in the virtual meeting interface as an action associated with the particular group participant at the physical location, and not as an action associated with the physical location that includes multiple group participants.

Various illustrative embodiments will now be described in detail with reference to the figures. It will be understood that the illustrative embodiments described below are provided as examples and that other examples not explicitly described herein may also be captured by the scope of the claims set forth below. Systems and methods described herein may provide any of the benefits mentioned above, as well as various additional and/or alternative benefits that will be described and/or made apparent below.

FIG. 1 shows an illustrative virtual meeting management system 100 for identifying an active speaker in a virtual meeting. As depicted in FIG. 1, virtual meeting management system 100 may include, without limitation, a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 may also be included within virtual meeting management system 100. In some examples, memory 102 and processor 104 may be distributed between multiple components, multiple devices, and/or multiple locations as may serve a particular implementation.

Memory 102 may store and/or otherwise maintain executable data used by processor 104 to perform any of the functionality described herein. For example, memory 102 may store instructions 106 that may be executed by processor 104. Additionally, memory 102 may also maintain any other data accessed, managed, used, and/or transmitted by processor 104 in a particular implementation. Memory 102 may be implemented by one or more memory or storage devices, including any memory or storage devices described herein, that are configured to store data in a transitory or non-transitory manner.

Instructions 106 may be executed by processor 104 to cause virtual meeting management system 100 to perform any of the functionality described herein. For example, instructions 106 may include a virtual meeting management application configured to perform any of the functionality described herein. In some embodiments, the virtual meeting management application may include various operating modes (e.g., an individual mode, an association mode, etc.) that can be selectively activated or deactivated as described herein. Instructions 106 may be implemented by any suitable application, software, code, and/or other executable data instance(s).

Processor 104 may be implemented by one or more computer processing devices, including general purpose processors (e.g., central processing units (CPUs), graphics processing units (GPUs), microprocessors, etc.), special purpose processors (e.g., application specific integrated circuits (ASICs), field-programmable gate arrays (FPGAs), etc.), or the like. Using processor 104 (e.g., when processor 104 is directed to perform operations represented by instructions 106 stored in memory 102), virtual meeting management system 100 may perform various functions associated with identifying an active speaker in a virtual meeting in any manner described herein or as may serve a particular implementation.

Figure 2:
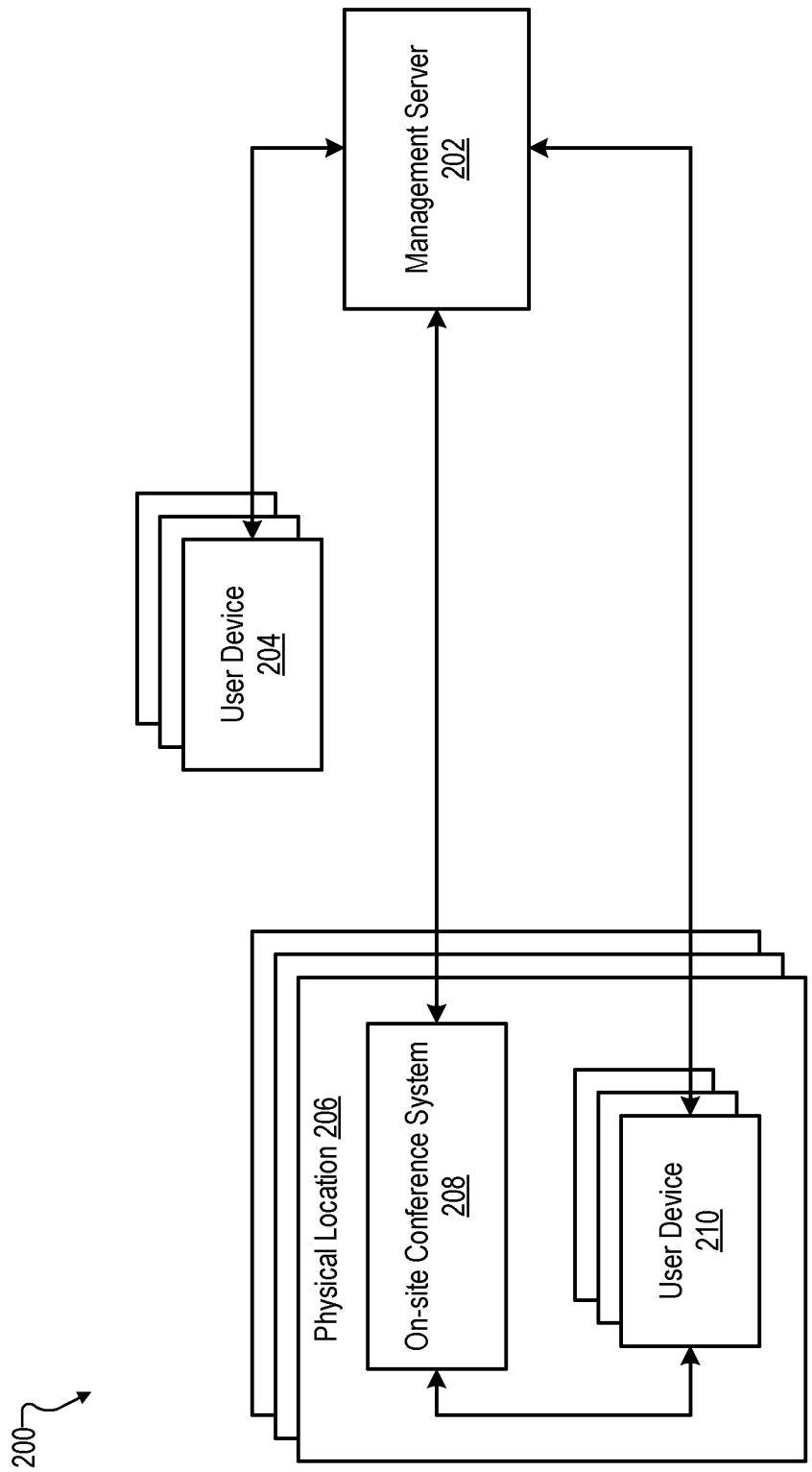
FIG. 2 shows an illustrative system in which a virtual meeting management system may be implemented according to embodiments described herein.

FIG. 2 shows an illustrative implementation 200 in which virtual meeting management system 100 may be deployed. The implementation 200 is described below in a context of a virtual meeting that includes one or more individual participants and one or more group participants.

As described herein, an individual participant may participate in the virtual meeting from a separate location (e.g., a home of the participant, an on-site personal office of the participant, etc.) with no other participants of the virtual meeting present at the separate location with the participant during the virtual meeting. On the other hand, a group participant may participate in the virtual meeting from a physical location (e.g., an on-site conference room) together with one or more other group participants of the virtual meeting. In some embodiments, a location from which an individual participant participates in the virtual meeting may be remote and/or distinct from a physical location from which multiple group participants participate in the virtual meeting.

As depicted in FIG. 2, the implementation 200 may include a management server 202, one or more user devices 204 of one or more individual participants in the virtual meeting, and one or more devices and/or systems at one or more physical locations 206 associated with the virtual meeting. Each physical location 206 may be a physical meeting space (e.g., a conference room) from which a plurality of group participants participate in the virtual meeting together as a group. As depicted in FIG. 2, physical location 206 may include an on-site conference system 208 equipped for physical location 206 and also include multiple user devices 210 of multiple group participants who participate in the virtual meeting from physical location 206. The group participants who participate in the virtual meeting from physical location 206 may be referred to as the group participant associated with physical location 206.

Management server 202 may be any suitable computing device that manages various aspects (e.g., a participant list, an active speaker indicator, etc.) of the virtual meeting. In some embodiments, management server 202 may be implemented in the form of a hardware server or a virtual server that includes a processor, a memory, and network communication capabilities (e.g., a communication unit). In some embodiments, management server 202 may be located on-site at a physical facility of a virtual meeting services provider, on a cloud-based system of a cloud services provider, or any combination thereof.

User device 204 may be a computing device (e.g., a personal computer, a mobile phone, a tablet, a laptop, etc.) associated with an individual participant of the virtual meeting. In some embodiments, user device 204 may implement a virtual meeting application and the individual participant may operate the virtual meeting application on user device 204 to electronically participate in the virtual meeting from his or her location. In some embodiments, user device 204 may capture video and/or audio of the individual participant in real-time to generate a participant stream of the individual participant in the virtual meeting. The participant stream of the individual participant may be a video-and-audio stream that depicts the individual participant and includes both video and audio of the individual participant in the virtual meeting.

On-site conference system 208 at physical location 206 (e.g., a conference room) may include a control device and one or more user interface devices equipped for physical location 206 and may be used by the group participants at physical location 206 to participate in the virtual meeting. In some embodiments, the control device and the user interface devices may be integrated into one or more portable units.

The control device may be a computing device communicatively coupled to the user interface devices and may be configured to control and manage operations of the user interface devices. For example, the group participants at physical location 206 may configure and/or adjust operation parameters of the user interface devices via the control device. The group participants may also use the control device to manage the virtual meeting (e.g., launch or terminate the virtual meeting) on on-site conference system 208 of physical location 206.

The user interface devices may include one or more input/output devices positioned and/or configured specifically for physical location 206. When the group participants participate in the virtual meeting from physical location 206, the user interface devices may receive inputs from the group participants and/or provide outputs to the group participants so that the group participants may interactively communicate in the virtual meeting. Non-limiting examples of the user interface devices include a display screen (e.g., a monitor, a touchscreen, etc.), a camera, a microphone, an audio speaker (e.g., a sound bar), a keyboard, a mouse, etc. Other types of user interface devices are also possible and contemplated.

In some embodiments, the user interface devices and/or the control device of on-site conference system 208 may be used to capture video and/or audio of the group participants in real-time to generate a group stream of physical location 206 in the virtual meeting. The group stream of physical location 206 may be a video-and-audio stream that depicts multiple group participants at physical location 206 and includes both video and audio of the multiple group participants at physical location 206 in the virtual meeting.

User device 210 at physical location 206 may be a computing device such as a portable computing device (e.g., a mobile phone, a tablet, a laptop, etc.) associated with a group participant who participates in the virtual meeting from physical location 206. In some embodiments, user device 210 may implement a virtual meeting application and the group participant may use the virtual meeting application on user device 210 to electronically perform one or more actions (e.g., sending a chat message, sharing a document, providing a user input indicating that the group participant will speak, etc.) in the virtual meeting. In some embodiments, user device 210 may capture video and/or audio of the group participant in real-time to generate a participant stream of the group participant at physical location 206. The participant stream of the group participant may be a video-only stream depicting the group participant which includes only the video of the group participant and does not include the audio of the group participant in the virtual meeting.

In some embodiments, virtual meeting management system 100 may be deployed with one or more components of the implementation 200. For example, virtual meeting management system 100 may be implemented at management server 202, user device 210 of a group participant at physical location 206, and/or any combination thereof. In some embodiments, management server 202 may collaborate with user device 210 of the group participant at physical location 206 to perform one or more operations of virtual meeting management system 100 described herein.

Figure 3:
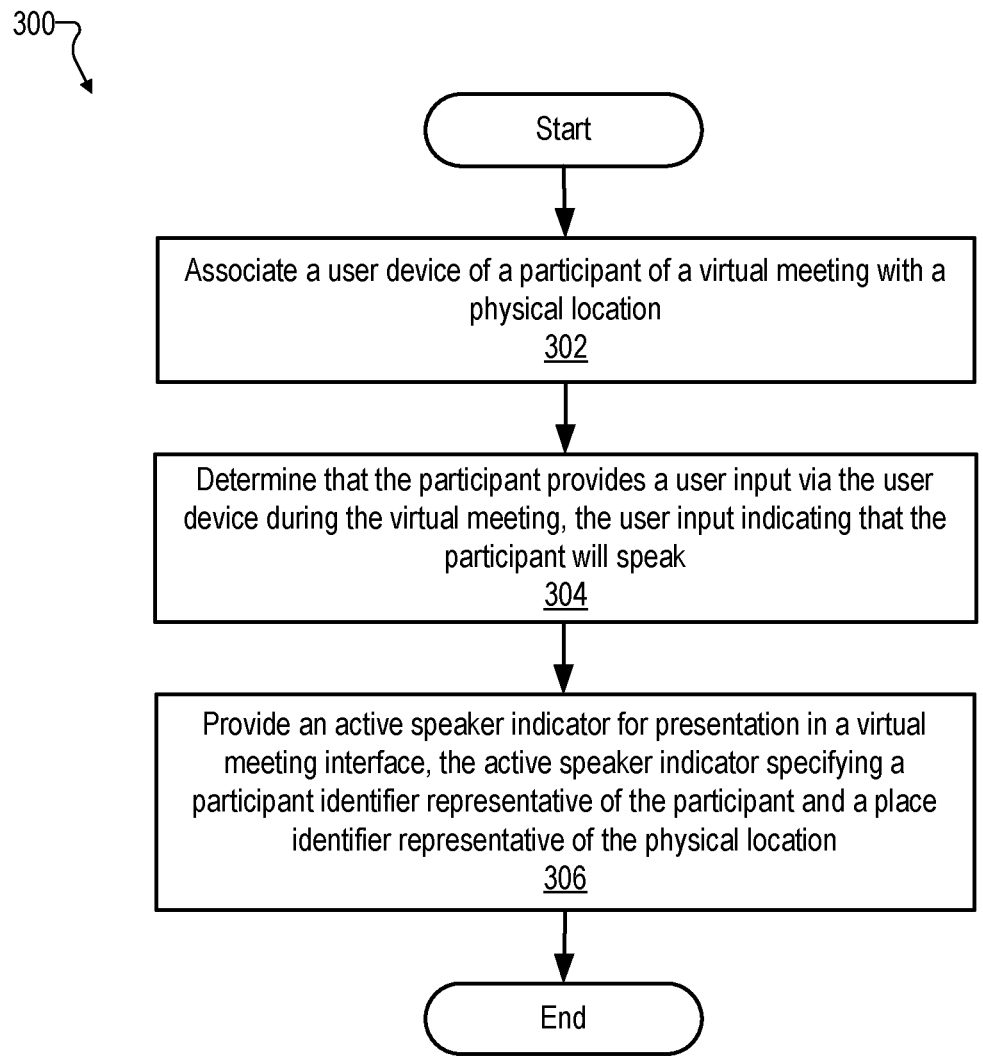
FIG. 3 shows an illustrative method for identifying an active speaker in a virtual meeting according to embodiments described herein.

FIG. 3 shows an illustrative method 300, which may be performed by virtual meeting management system 100 and/or by any implementation thereof for identifying an active speaker in a virtual meeting. While FIG. 3 shows illustrative operations according to one embodiment, other embodiments may omit, add to, reorder, and/or modify any of the operations shown in FIG. 3. In some examples, multiple operations shown in FIG. 3 or described in relation to FIG. 3 may be performed concurrently (e.g., in parallel) with one another, rather than being performed sequentially as illustrated and/or described.

At operation 302, virtual meeting management system 100 may associate a user device 210 of a participant (e.g., a group participant) of the virtual meeting with a physical location 206 from which the group participant and one or more additional participants (e.g., one or more other group participants) participate in the virtual meeting together as a group. As described herein, the association between user device 210 of the group participant and physical location 206 may be maintained throughout a participation time of the group participant in the virtual meeting. In some embodiments, when the association between user device 210 of the group participant and physical location 206 is created, virtual meeting management system 100 may activate an association mode on user device 210 of the group participant. The association mode may include a user interface element (e.g., a selectable button) for the group participant to provide a user input indicating that the group participant will speak.

At operation 304, virtual meeting management system 100 may determine that the group participant provides a user input via user device 210 during the virtual meeting and the user input may indicate that the group participant will speak. For example, the group participant may use the user interface element on user device 210 to provide the user input indicating that the group participant will speak and then speak in the virtual meeting.

At operation 306, based on the user input and the associating between user device 210 of the group participant and physical location 206, virtual meeting management system 100 may provide an active speaker indicator corresponding to the group participant for presentation in a virtual meeting interface provided to one or more participants of the virtual meeting. For example, virtual meeting management system 100 may provide the active speaker indicator corresponding to the group participant to a user interface component of user device 204 of each individual participant in the virtual meeting. The user interface component of user device 204 may then display the active speaker indicator in the virtual meeting interface provided to the individual participant. Similarly, virtual meeting management system 100 may provide the active speaker indicator corresponding to the group participant to a user interface component such as the user interface devices of on-site conference system 208 at each physical location 206 of the virtual meeting. The user interface devices of on-site conference system 208 may then display the active speaker indicator in the virtual meeting interface provided to the group participants at physical location 206. Accordingly, virtual meeting management system 100 may present the active speaker indicator corresponding to the group participant in the virtual meeting interface of the virtual meeting. In some embodiments, the active speaker indicator may specify a participant identifier representative of the group participant and a place identifier representative of physical location 206 from which the group participant participates in the virtual meeting.

For example, based on the user input provided via user device 210 of the group participant and based on the association between user device 210 of the group participant and physical location 206, virtual meeting management system 100 may respectively determine that the group participant is an active speaker of the virtual meeting and that the group participant participates in the virtual meeting from physical location 206. In response to such determinations, virtual meeting management system 100 may present an active speaker indicator corresponding to the group participant in the virtual meeting interface provided to one or more participants (e.g., the individual participants, the group participants at one or more physical locations 206) of the virtual meeting. For example, virtual meeting management system 100 may provide the active speaker indicator corresponding to the group participant to a user interface component (e.g., the user interface component of user device 204 of each individual participant and the user interface devices of on-site conference system 208 at each physical location 206 of the virtual meeting) for presentation in the virtual meeting interface.

As an example, the active speaker indicator may include a graphical element indicating the participant identifier (e.g., a participant name) of the group participant who is speaking in the virtual meeting. In some embodiments, the graphical element may be overlaid on a video-and-audio stream of physical location 206 that includes the speaking participant and the video-and-audio stream of physical location 206 may be displayed in the virtual meeting interface with the place identifier (e.g., a conference room name) of physical location 206. Accordingly, the active speaker indicator may inform the participants of the virtual meeting about the participant identifier (e.g., the participant name) of the speaking participant in the virtual meeting and the place identifier (e.g., the conference room name) of physical location 206 that includes the speaking participant.

In some embodiments, to associate user device 210 of the group participant with physical location 206 from which the group participant and one or more other group participants participate in the virtual meeting together, virtual meeting management system 100 may determine that user device 210 of the group participant obtains an identifier presented at physical location 206. The identifier may be unique to the virtual meeting and physical location 206 and may be presented only at physical location 206. For example, the identifier may be a machine-readable label (e.g., a Quick Response (QR) code, a barcode, etc.) or a string (e.g., a sequence of characters, numbers, and/or symbols, etc.) locally presented by on-site conference system 208 of physical location 206 during the virtual meeting. In some embodiments, the identifier may also be presented at physical location 206 during a limited time window (e.g., 5 minutes) prior to a start time of the virtual meeting.

In some embodiments, to conform to a meeting policy of the virtual meeting, each group participant at physical location 206 may input the identifier into his or her user device 210 when participating in the virtual meeting from physical location 206. For example, the group participant may enter the identifier in the form of a string into the virtual meeting application on user device 210 of the group participant. Additionally or alternatively, the group participant may scan the identifier in the form of a QR code or a barcode when prompted by the virtual meeting application on user device 210 of the group participant. Other implementations for user device 210 of the group participant to obtain the identifier presented at physical location 206 are also possible and contemplated.

Thus, when the identifier presented only at physical location 206 is obtained by user device 210 of a participant, the participant may be at physical location 206 in person with user device 210 and may participate in the virtual meeting from physical location 206 as a group participant among multiple group participants at physical location 206. In some embodiments, in response to the determining that user device 210 of the group participant obtains the identifier presented at physical location 206, virtual meeting management system 100 may associate user device 210 of the group participant with physical location 206 for a participation time of the group participant in the virtual meeting.

For example, upon obtaining the identifier presented at physical location 206, user device 210 of the group participant may transmit an association request to management server 202. The association request may include a device identifier (ID) of user device 210 and the identifier that user device 210 obtains at physical location 206. As described herein, the identifier obtained at physical location 206 may uniquely identify the virtual meeting and physical location 206.

In some embodiments, when receiving the association request from user device 210, management server 202 may authenticate user device 210 and the group participant associated with user device 210. For example, management server 202 may use the device ID of user device 210 to determine whether user device 210 is included in a device registration record maintained by management server 202. If user device 210 is included in the device registration record, management server 202 may determine that user device 210 is previously registered with management server 202. Management server 202 may then determine a user associated with user device 210 based on the device registration record.

In some embodiments, management server 202 may also determine whether the user associated with user device 210 is invited to the virtual meeting. For example, management server 202 may determine the virtual meeting and physical location 206 based on the identifier included in the association request. As described herein, the identifier may be obtained at physical location 206 and may uniquely identify the virtual meeting and physical location 206. In some embodiments, management server 202 may communicate with a meeting schedule server (not shown) to obtain an invitee list of the virtual meeting and determine whether the user associated with user device 210 is included in the invitee list. If the user associated with user device 210 is included in the invitee list, management server 202 may verify that the user is a legitimate participant of the virtual meeting and that the user is present at physical location 206 in person with user device 210 to participate in the virtual meeting from physical location 206 as a group participant.

In some embodiments, if management server 202 verifies that user device 210 is previously registered with management server 202 and that the user associated with user device 210 is a legitimate group participant of the virtual meeting at physical location 206, management server 202 may update a participant list of the virtual meeting to include the user as a group participant participating in the virtual meeting from physical location 206. Management server 202 may also associate user device 210 of the group participant with physical location 206. For example, management server 202 may map the device ID of user device 210 of the group participant to the place identifier of physical location 206. Additionally or alternatively, management server 202 may assign a temporary ID to user device 210 of the group participant. The temporary ID may uniquely identify both user device 210 of the group participant and physical location 206 from which the group participant participates in the virtual meeting. In some embodiments, the temporary ID may be used in various communication to and from user device 210 of the group participant during the participation time of the group participant in the virtual meeting. Other implementations for associating user device 210 of the group participant with physical location 206 are also possible and contemplated. In some embodiments, the association between user device 210 of the group participant and physical location 206 may be maintained only for the participation time during which the group participant participates in the virtual meeting.

In some embodiments, in response to the associating of user device 210 of the group participant with physical location 206, virtual meeting management system 100 may activate an association mode on user device 210 of the group participant. For example, when the association between user device 210 of the group participant and physical location 206 is created, management server 202 may transmit to user device 210 of the group participant an association notification indicating that user device 210 of the group participant is successfully associated with physical location 206. In some embodiments, the association notification may also include the temporary ID assigned to user device 210 of the group participant. In response to the association notification, user device 210 of the group participant may activate an association mode in the virtual meeting application operating on user device 210 of the group participant. The association mode may remain active on user device 210 of the group participant during the participation time of the group participant in the virtual meeting.

In some embodiments, the association mode may include a user interface element (e.g., a selectable button) for the group participant to provide a user input indicating that the group participant will speak. The user interface element may be enabled only when the virtual meeting application on user device 210 of the group participant is in the association mode due to the successful association between user device 210 of the group participant and physical location 206 that includes the group participant. In some embodiments, when the group participant desires to speak in the virtual meeting, the group participant may select the user interface element on his or her user device 210, to provide the user input indicating that the group participant would like to speak. Subsequently, the group participant will then begin speaking. Thus, the group participant may select the user interface element to identify himself or herself as an active speaker in the virtual meeting. In some embodiments, when the group participant finishes speaking, the group participant may select the user interface element or select a different user interface element on user device 210 to indicate that the group participant is no longer an active speaker in the virtual meeting.

In some embodiments, virtual meeting management system 100 may determine that the group participant provides the user input indicating that the group participant will speak and may present an active speaker indicator corresponding to the group participant in the virtual meeting interface accordingly. To present the active speaker indicator corresponding to the group participant, virtual meeting management system 100 may determine the participant identifier representative of the group participant based on the user input. The participant identifier may include a name of the group participant. Virtual meeting management system 100 may also determine the place identifier representative of physical location 206 from which the group participant participates in the virtual meeting. The place identifier may include a name (e.g., a conference room name) of physical location 206 and may be determined based on the association between user device 210 of the group participant and physical location 206.

For example, in response to receiving the user input from the group participant indicating that the group participant will speak, user device 210 of the group participant may transmit an active speaker notification to management server 202. The active speaker notification may include the device ID of user device 210 of the group participant and/or the temporary ID assigned to user device 210 of the group participant. In some embodiments, in addition to the active speaker notification, user device 210 of the group participant may also transmit a participant stream of the group participant to management server 202. As described herein, the participant stream of the group participant may be a video-only stream of the group participant captured by user device 210 of the group participant. For example, the participant stream of the group participant may include only the video of the group participant and does not include the audio of the group participant in the virtual meeting.

In some embodiments, when receiving the active speaker notification from user device 210, management server 202 may reference the device registration record using the device ID of user device 210 included in the active speaker notification, and determine the participant identifier (e.g., the participant name) of the group participant associated with user device 210. Additionally or alternatively, management server 202 may determine the device ID of user device 210 specified by the temporary ID included in the active speaker notification, and then determine the participant identifier (e.g., the participant name) of the group participant associated with user device 210 based on the device ID of user device 210 as described above.

In some embodiments, management server 202 may also retrieve the mapping associated with the device ID of user device 210, and determine the place identifier (e.g., the conference room name) of physical location 206 associated with user device 210 of the group participant to be the place identifier being mapped to the device ID of user device 210. Additionally or alternatively, management server 202 may determine the place identifier specified by the temporary ID included in the active speaker notification, and determine the place identifier (e.g., the conference room name) of physical location 206 associated with user device 210 of the group participant to be the place identifier specified by the temporary ID.

Accordingly, based on user device 210 that receives the user input from the group participant indicating that the group participant will speak and based on the association between user device 210 and physical location 206 that includes the group participant, management server 202 may determine the participant identifier (e.g., the participant name) of the group participant who provides the user input and determine the place identifier (e.g., the conference room name) of physical location 206 from which the group participant participates in the virtual meeting. Other implementations for determining the participant identifier of the group participant and the place identifier of physical location 206 are also possible and contemplated.

In some embodiments, based on the participant identifier (e.g., the participant name) of the group participant and the place identifier (e.g., the conference room name) of physical location 206 from which the group participant participates in the virtual meeting, management server 202 may generate the active speaker indicator corresponding to the group participant and present the active speaker indicator in the virtual meeting interface provided to one or more participants of the virtual meeting. Additionally or alternatively, management server 202 may transmit active speaker data (e.g., the participant identifier of the group participant, the participant stream of the group participant, the place identifier of physical location 206, etc.) associated with the group participant to user devices 210 of the individual participants and/or to on-site conference system 208 of one or more physical locations 206 that include the group participants of the virtual meeting. In this case, user devices 210 of the individual participants and/or on-site conference system 208 of physical locations 206 may generate the active speaker indicator corresponding to the group participant and present the active speaker indicator in the virtual meeting interface.

In some embodiments, to present the active speaker indicator corresponding to the group participant in the virtual meeting interface, management server 202 may generate a graphical element including the participant identifier of the group participant and a video-only stream of the group participant captured by user device 210 of the group participant. As described herein, user device 210 of the group participant may transmit the video-only stream of the group participant to management server 202 when the group participant uses the user interface element (e.g., the selectable button) on user device 210 to provide the user input indicating that the group participant will speak and thereby identifying himself or herself as an active speaker of the virtual meeting. In some embodiments, management server 202 may present the graphical element (also referred to as a spotlight element) in the virtual meeting interface and the graphical element may be displayed in association with a video-and-audio stream of physical location 206 from which the group participant participates in the virtual meeting. For example, the graphical element may be overlaid on the video-and-audio stream of physical location 206 captured by on-site conference system 208 of physical location 206.

Figure 4:
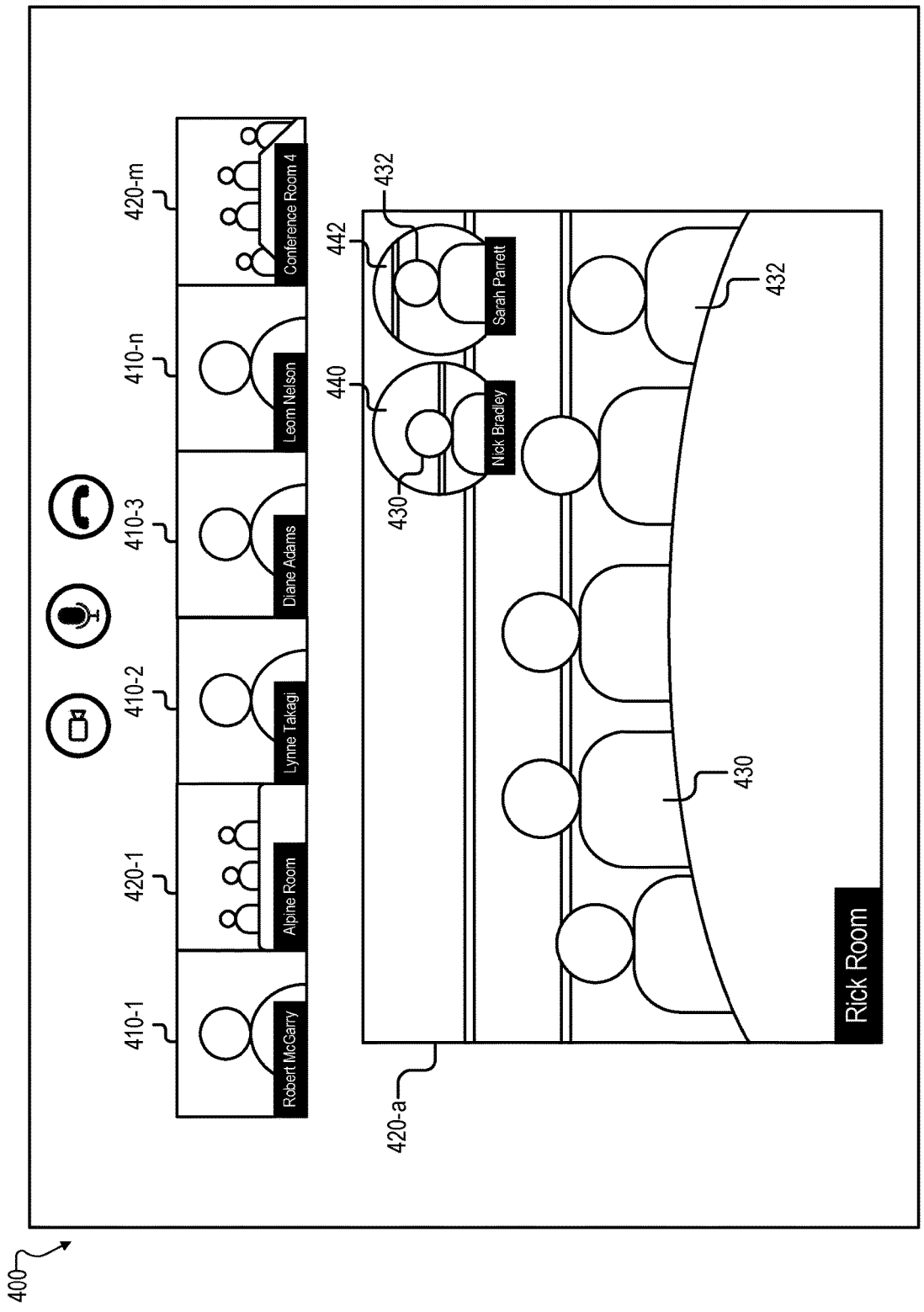
FIGS. 4-7 show illustrative virtual meeting interfaces according to embodiments described herein.

As an example, FIG. 4 illustrates a virtual meeting interface 400 that includes an active speaker indicator corresponding to a group participant who is speaking in a virtual meeting from a physical location 206. As described herein, the virtual meeting may include one or more individual participants and a plurality of group participants.

In some embodiments, the individual participants may participate in the virtual meeting from their separate location as described herein. Each individual participant of the virtual meeting may be represented by a participant stream 410 of the individual participant in virtual meeting interface 400 as depicted in FIG. 4. In some embodiments, participant stream 410 of the individual participant may be a video-and-audio stream depicting the individual participant and may be captured by user device 210 of the individual participant. As depicted in FIG. 4, participant stream 410 of the individual participant may be presented with a participant identifier (e.g., a participant name) of the individual participant in virtual meeting interface 400.

In some embodiments, the group participants may participate in the virtual meeting from one or more physical locations 206. Each physical location 206 may include a plurality of group participants and may be represented by a group stream 420 of physical location 206 in virtual meeting interface 400 as depicted in FIG. 4. In some embodiments, group stream 420 of physical location 206 may be a video-and-audio stream depicting the plurality of group participants at physical location 206 and may be captured by on-site conference system 208 of physical location 206. As depicted in FIG. 4, group stream 420 of physical location 206 may be presented with a place identifier (e.g., a conference room name) of physical location 206 in virtual meeting interface 400.

In some embodiments, when an individual participant is speaking in the virtual meeting, participant stream 410 of the individual participant may be highlighted in virtual meeting interface 400. For example, participant stream 410 of the individual participant may be presented in a largest stream display element at a center area of virtual meeting interface 400. Similarly, when one or more group participants at a physical location 206 are speaking in the virtual meeting, group stream 420 of physical location 206 may be highlighted in virtual meeting interface 400. For example, group stream 420 of physical location 206 may be presented in the largest stream display element at the center area of virtual meeting interface 400 as depicted in FIG. 4.

As depicted in FIG. 4, a group participant 430 at a particular physical location 206 (e.g., a conference room that has a conference room name "Rick Room") may identify himself or herself as an active speaker of the virtual meeting. For example, group participant 430 may use the user interface element (e.g., the selectable button) on his or her user device 210 to provide the user input indicating that group participant 430 will speak. Based on the user input received by user device 210 of group participant 430 and based on the association between user device 210 of group participant 430 and the particular physical location 206, management server 202 may determine a participant identifier (e.g., a participant name "Nick Bradley") of group participant 430 and also determine a place identifier (e.g., the conference room name "Rick Room") of the particular physical location 206 that includes group participant 430 as described herein. Management server 202 may then generate an active speaker indicator corresponding to group participant 430 based on the participant identifier of group participant 430 and the place identifier of the particular physical location 206, and present the active speaker indicator in virtual meeting interface 400 as described herein.

As depicted in FIG. 4, the active speaker indicator corresponding to group participant 430 may include a spotlight element 440. Spotlight element 440 may indicate the participant identifier (e.g., the participant name "Nick Bradley") of group participant 430 as depicted in FIG. 4.

As depicted in FIG. 4, spotlight element 440 may also include a participant stream of group participant 430. As described herein, the participant stream of group participant 430 may be a video-only stream captured by user device 210 of group participant 430. For example, the participant stream of group participant 430 may include only the video of group participant 430 and does not include the audio of group participant 430. Accordingly, user device 210 of group participant 430 may not capture the audio of group participant 430 at the particular physical location 206. Because the audio of group participant 430 at the particular physical location 206 is not captured by both user device 210 of group participant 430 and on-site conference system 208 of the particular physical location 206, negative audio effects such as echoing may be avoided.

In some embodiments, a camera on user device 210 of group participant 430 may be turned off, and therefore user device 210 of group participant 430 may not be able to capture the participant stream of group participant 430. In this case, spotlight element 440 may include a profile image of group participant 430 instead of the participant stream of group participant 430. In some embodiments, even the profile image of group participant 430 may not be available. In this case, spotlight element 440 may include a default profile image instead of the profile image of group participant 430.

In some embodiments, to present the active speaker indicator corresponding to group participant 430 in virtual meeting interface 400, management server 202 may present spotlight element 440 in association with group stream 420 of the particular physical location 206. For example, spotlight element 440 may be overlaid on a portion of group stream 420 of the particular physical location 206 as depicted in FIG. 4. As described herein, spotlight element 440 may indicate the participant identifier (e.g., the participant name "Nick Bradley") of group participant 430 and group stream 420 of the particular physical location 206 may be presented with the place identifier (e.g., the conference room name "Rick Room") of the particular physical location 206 in virtual meeting interface 400. Accordingly, with spotlight element 440 overlaid on group stream 420 of the particular physical location 206 in virtual meeting interface 400, the active speaker indicator corresponding to group participant 430 may provide the participants of the virtual meeting with not only the participant identifier (e.g., the participant name "Nick Bradley") of group participant 430 who is an active speaker of the virtual meeting but also with the place identifier (e.g., the conference room name "Rick Room") of the particular physical location 206 from which group participant 430 participates in the virtual meeting. Thus, the need for the participants of the virtual meeting to detect group participant 430 as the speaking participant and also recognize group participant 430 from group stream 420 of the particular physical location 206 may be eliminated.

In addition, spotlight element 440 may also include the participant stream of group participant 430 as described herein. In some embodiments, the participant stream of group participant 430 may be captured by user device 210 of group participant 430 and may depict only group participant 430. On the other hand, group stream 420 of the particular physical location 206 may be captured by on-site conference system 208 of the particular physical location 206 and may depict a plurality of group participants at the particular physical location 206 including group participant 430.

Accordingly, the participant stream of group participant 430 included in spotlight element 440 may be captured from a different perspective and at a shorter distance from group participant 430 as compared to group stream 420 of the particular physical location 206 on which spotlight element 440 is overlaid. In some embodiments, the participant stream of group participant 430 may be presented in spotlight element 440 with a look and feel similar to a participant stream 410 of an individual participant in virtual meeting interface 400.

In some embodiments, while the active speaker indicator corresponding to group participant 430 at the particular physical location 206 is presented in virtual meeting interface 400, a different group participant (e.g., a group participant 432) at the particular physical location 206 may desire to speak in the virtual meeting. For example, group participant 432 may use the user interface element (e.g., the selectable button) on his or her user device 210 to provide the user input indicating that group participant 432 will speak, thereby identifying himself or herself as another active speaker of the virtual meeting. In response to the user input from group participant 432, virtual meeting management system 100 may present an active speaker indicator corresponding to group participant 432 in virtual meeting interface 400 in a manner similar to the active speaker indicator corresponding to group participant 430 described above.

For example, based on the user input provided by group participant 432 via user device 210 of group participant 432 and based on the association between user device 210 of group participant 432 and the particular physical location 206 that includes group participant 432, management server 202 may determine a participant identifier (e.g., a participant name "Sarah Parrett") of group participant 432 and also determine the place identifier (e.g., the conference room name "Rick Room") of the particular physical location 206 from which group participant 432 participates in the virtual meeting. Management server 202 may then generate an active speaker indicator corresponding to group participant 432 based on the participant identifier of group participant 432 and the place identifier of the particular physical location 206, and present the active speaker indicator corresponding to group participant 432 in virtual meeting interface 400.

In some embodiments, the active speaker indicator corresponding to group participant 432 may include a spotlight element 442 as depicted in FIG. 4. Similar to spotlight element 440 depicted in FIG. 4, spotlight element 442 may indicate the participant identifier (e.g., the participant name "Sarah Parrett") of group participant 432 and may include a participant stream of group participant 432. As described herein, the participant stream of group participant 432 may be a video-only stream captured by user device 210 of group participant 432 and may depict only group participant 432. In some embodiments, to present the active speaker indicator corresponding to group participant 432 in virtual meeting interface 400, management server 202 may present spotlight element 442 in association with group stream 420 of the particular physical location 206 that includes group participant 432. For example, spotlight element 442 may be overlaid on a portion of group stream 420 of the particular physical location 206 without overlapping on spotlight element 440 of the active speaker indicator corresponding to group participant 430 as depicted in FIG. 4.

Thus, spotlight element 440 and spotlight element 442 may respectively inform the participants of the virtual meeting about the participant identifier (e.g., the participant name "Nick Bradley") of group participant 430 and the participant identifier (e.g., the participant name "Sarah Parrett") of group participant 432 who identify themselves as the active speakers of the virtual meeting. As spotlight element 440 and spotlight element 442 are both overlaid on group stream 420 of the particular physical location 206 as depicted in FIG. 4, the participants of the virtual meeting may also be informed of the place identifier (e.g., the conference room name "Rick Room") of the particular physical location 206 from which group participant 430 and group participant 432 participate in the virtual meeting.

In some embodiments, management server 202 may apply a predefined active speaker threshold to one or more physical locations 206 associated with the virtual meeting. The active speaker threshold may indicate a threshold number of group participants at each physical location 206 that may be active speakers of the virtual meeting at the same time. In some embodiments, management server 202 may determine that a number of active speakers of the virtual meeting at a physical location 206 reaches the predefined active speaker threshold. In response to such determination, management server 202 may identify one or more non-speaking participants at physical location 206 who are not currently an active speaker of the virtual meeting, and instruct user device 210 of the non-speaking participants to temporarily disable the user interface element (e.g., the selectable button) being used to indicate that a group participant will speak, thereby preventing the non-speaking participants at physical location 206 from identifying themselves as another active speaker of the virtual meeting.

In some embodiments, when one or more active speakers in the virtual meeting finish speaking, the one or more active speakers may select the user interface element or a different user interface element on their user device 210 to stop identifying themselves as an active speaker of the virtual meeting as described herein. Accordingly, the number of active speakers of the virtual meeting at physical location 206 may decrease and no longer satisfy the predefined active speaker threshold. In this case, management server 202 may instruct user devices 210 of the non-speaking participants at physical location 206 to re-enable the user interface element that is used to indicate that a group participant will speak. At this point, these group participants may identify themselves as an active speaker of the virtual meeting using the user interface element on their user device 210.

Figure 5:
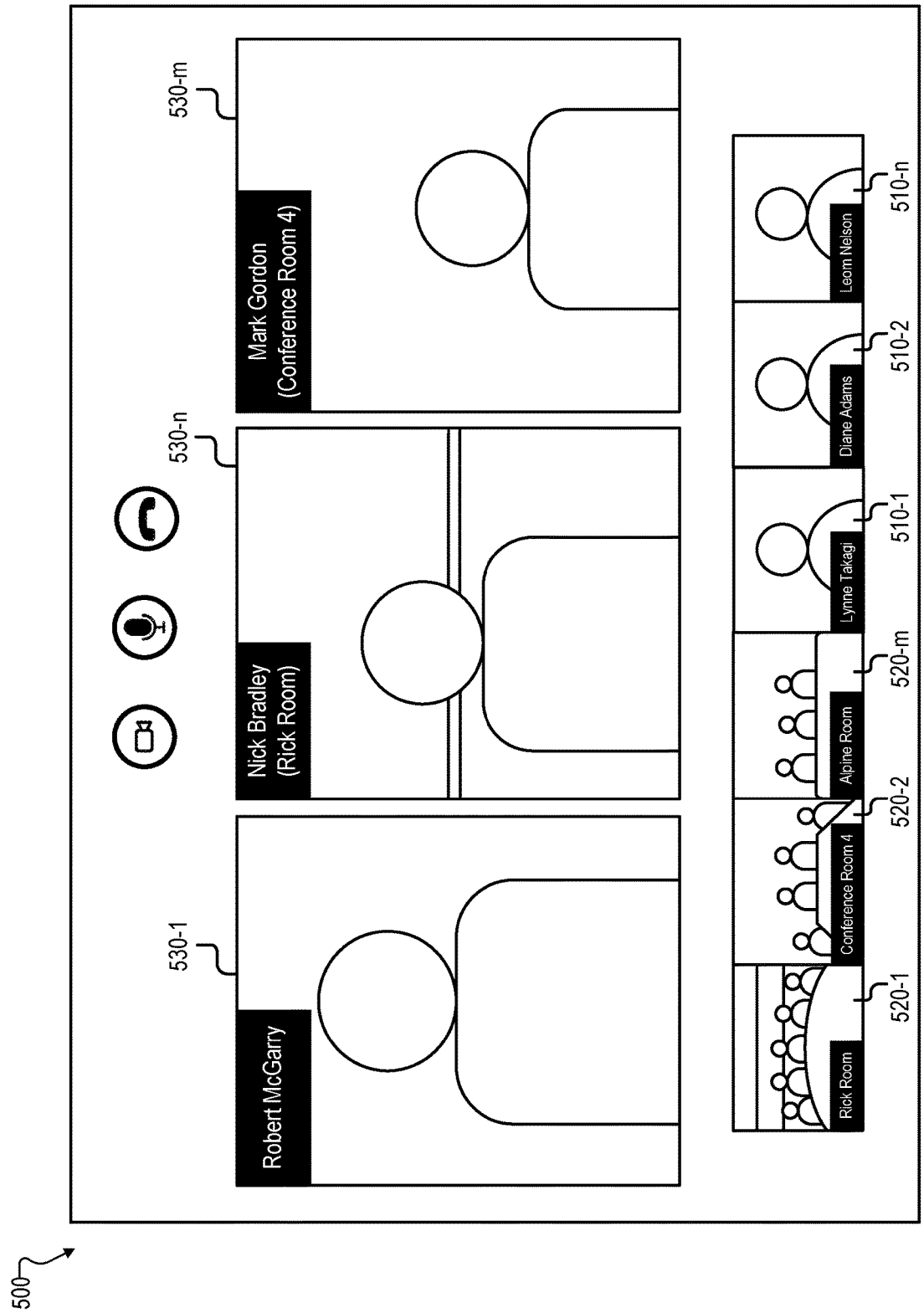

FIG. 5 illustrates a different virtual meeting interface 500 of the virtual meeting described above with reference to FIG. 4. Similar to virtual meeting interface 400 in FIG. 4, virtual meeting interface 500 may include one or more participant streams 510 and one or more group streams 520. Each participant stream 510 may represent an individual participant of the virtual meeting and may be a video-and-audio stream captured by user device 210 of the individual participant that depicts only the individual participant. On the other hand, each group stream 520 may represent a physical location 206 associated with the virtual meeting and may be a video-and-audio stream captured by on-site conference system 208 of physical location 206 that depicts a plurality of group participants at physical location 206. As depicted in FIG. 5, virtual meeting interface 500 may also include one or more active speaker indicators 530 corresponding to one or more active speakers of the virtual meeting.

In some embodiments, for an active speaker who is an individual participant of the virtual meeting, an active speaker indicator 530 corresponding to the individual participant may include a participant identifier (e.g., a participant name) of the individual participant and also include a participant stream 510 of the individual participant. As described herein, participant stream 510 of the individual participant may be a video-and-audio stream of the individual participant captured by user device 210 of the individual participant.

In some embodiments, for an active speaker who is a group participant of the virtual meeting at a physical location 206, an active speaker indicator 530 corresponding to the group participant may include a participant identifier (e.g., a participant name) of the group participant and a place identifier (e.g., a conference room name) of physical location 206 from which the group participant participates in the virtual meeting. Active speaker indicator 530 corresponding to the group participant may also include a participant stream of the group participant. As described herein, the participant stream of the group participant may be a video-only stream of the group participant captured by user device 210 of the group participant. As described herein, active speaker indicator 530 corresponding to the group participant may be presented in virtual meeting interface 500 when the group participant uses the user interface element (e.g., the selectable button) on his or her user device 210 to provide the user input indicating that the group participant will speak and thereby identifying himself or herself as an active speaker of the virtual meeting.

For example, as depicted in FIG. 5, virtual meeting interface 500 may include an active speaker indicator 530-1 corresponding to an individual participant of the virtual meeting. As depicted in FIG. 5, active speaker indicator 530-1 may include a graphic element indicating a participant identifier (e.g., a participant name "Robert McGarry") of the individual participant. Active speaker indicator 530-1 may also include a participant stream 510 of the individual participant that is captured by user device 210 of the individual participant and depicts only the individual participant.

As depicted in FIG. 5, virtual meeting interface 500 may also include an active speaker indicator 530-n corresponding to a first group participant of the virtual meeting at a first physical location 206 and an active speaker indicator 530-m corresponding to a second group participant of the virtual meeting at a second physical location 206. The second physical location 206 may be the same as the first physical location 206 or may be different from the first physical location 206.

As depicted in FIG. 5, active speaker indicator 530-n may include a graphic element indicating a participant identifier (e.g., a participant name "Nick Bradley") of the first group participant and a place identifier (e.g., a conference room name "Rick Room") of the first physical location 206 from which the first group participant participates in the virtual meeting. Active speaker indicator 530-n may also include a participant stream of the first group participant that is captured by user device 210 of the first group participant and depicts only the first group participant. Similarly, active speaker indicator 530-m may include a graphic element indicating a participant identifier (e.g., a participant name "Mark Gordon") of the second group participant and a place identifier (e.g., a conference room name "Conference Room 4") of the second physical location 206 from which the second group participant participates in the virtual meeting. Active speaker indicator 530-m may also include a participant stream of the second group participant that is captured by user device 210 of the second group participant and depicts only the second group participant. Thus, virtual meeting interface 500 may include one or more active speaker indicators 530 corresponding to one or more group participants who are speaking in the virtual meeting from different physical locations 206 as depicted in FIG. 5. Additionally or alternatively, the one or more active speaker indicators 530 in virtual meeting interface 500 may correspond to one or more group participants who are speaking in the virtual meeting from the same physical location 206.

Accordingly, for a group participant of the virtual meeting at a physical location 206 such as the first group participant at the first physical location 206 and the second group participant at the second physical location 206, the active speaker indicator corresponding to the group participant may be presented separately from group stream 520 of physical location 206 and may include the participant stream of the group participant that depicts only the group participant. Due to the graphic element in the active speaker indicator that indicates both the participant identifier (e.g., the participant name) of the group participant and the place identifier (e.g., the conference room name) of physical location 206 including the group participant, the participants of the virtual meeting may perceive that the active speaker indicator corresponds to a group participant at a physical location 206 and does not correspond to an individual participant of the virtual meeting. In addition, the participants of the virtual meeting may also be informed of not only the participant identifier (e.g., the participant name) of the group participant but also the place identifier (e.g., the conference room name) of physical location 206 from which the group participant participates in the virtual meeting. As a result, the need for the participants of the virtual meeting to detect the group participant who is speaking in the virtual meeting and recognize the group participant from group stream 520 of physical location 206 that includes the group participant may be eliminated.

As described herein, the display of the active speaker indicator corresponding to the group participant in the virtual meeting interface such as virtual meeting interfaces 400 and 500 may be triggered when the group participant uses the user interface element (e.g., the selectable button) on his or her user device 210 to provide the user input indicating that the group participant will speak and thereby identifying himself or herself as an active speaker of the virtual meeting. In some embodiments, virtual meeting management system 100 may include a voice detection component configured to detect an utterance of the group participant after the group participant provides the user input indicating that the group participant will speak. The voice detection component may be implemented on user device 210 of the group participant and may operate locally on user device 210 to detect an utterance of the group participant without communicating with a different computing device. As the utterance of the group participant is kept within user device 210 of the group participant, the privacy of the group participant and the confidentiality of the virtual meeting may be protected.

In some embodiments, the voice detection component may be implemented on user device 210 in the form of a machine learning model. The machine learning model may be trained with various audio samples of the group participant associated with user device 210 to detect a specific voice of the group participant. Additionally or alternatively, the voice detection component may detect an utterance of the group participant based on an audio intensity level of the utterance. Because the group participant may have the lowest distance to user device 210 of the group participant on which the voice detection component operates, the utterance initiated by the group participant may have the highest audio intensity level as compared to other sound or speech in physical location 206 where the group participant participates in the virtual meeting.

In some embodiments, when the group participant provides the user input indicating that the group participant will speak, virtual meeting management system 100 may use the voice detection component to determine whether the group participant has spoken during a predefined time period (e.g., 3 minutes) subsequent to the user input. For example, after receiving the user input from the group participant, user device 210 of the group participant may operate its voice detection component to detect an utterance initiated by the group participant. If the voice detection component does not detect any utterance initiated by the group participant during the predefined time period subsequent to the user input, user device 210 of the group participant may determine that the group participant has not spoken during the predefined time period after the user input is provided.

In some embodiments, based on such detection, virtual meeting management system 100 may determine that the group participant provides the user input indicating that the group participant will speak but end up not speaking. Accordingly, virtual meeting management system 100 may remove the active speaker indicator corresponding to the group participant from the virtual meeting interface of the virtual meeting. For example, virtual meeting management system 100 may instruct a user interface component (e.g., the user interface component of user device 204 of each individual participant and the user interface devices of on-site conference system 208 at each physical location 206 of the virtual meeting) to remove the active speaker indicator corresponding to the group participant from the virtual meeting interface of the virtual meeting.

As an example, based on the detection that the group participant has not spoken during the predefined time period after the user input is provided, user device 210 of the group participant may transmit a no-speaking notification to management server 202. The no-speaking notification may indicate that the group participant associated with user device 210 does not speak after identifying himself or herself as an active speaker of the virtual meeting. In some embodiments, the no-speaking notification may include the device ID of user device 210 of the group participant and/or the temporary ID assigned to user device 210 of the group participant.

In some embodiments, when receiving the no-speaking notification from user device 210, management server 202 may use the device ID of user device 210 and/or the temporary ID assigned to user device 210 that are included in the no-speaking notification to identify the group participant associated with user device 210 as described herein. Management server 202 may then remove the active speaker indicator corresponding to the group participant from the virtual meeting interface of the virtual meeting. Thus, when the group participant provides the user input indicating that the group participant plans on speaking, but then does not speak, the active speaker indicator corresponding to the group participant may be automatically removed from the virtual meeting interface and the group participant may no longer be considered an active speaker of the virtual meeting.

Thus, for each group participant who identifies himself or herself as an active speaker of the virtual meeting, virtual meeting management system 100 may present an active speaker indicator corresponding to the group participant in the virtual meeting interface as described above. The active speaker indicator may indicate both the participant identifier (e.g., the participant name) of the group participant and the place identifier (e.g., the conference room name) of physical location 206 that includes the group participant. In some embodiments, for each group participant who participates in the virtual meeting from a physical location 206, virtual meeting management system 100 may also present a participant identifier (e.g., a participant name) of the group participant in association with a place identifier (e.g., a conference room name) of physical location 206 that includes the group participant in a participant list of the virtual meeting. For example, virtual meeting management system 100 may instruct a user interface component (e.g., the user interface component of user device 204 of each individual participant and the user interface devices of on-site conference system 208 at each physical location 206 of the virtual meeting) to present the participant identifier (e.g., the participant name) of the group participant in association with the place identifier (e.g., the conference room name) of physical location 206 that includes the group participant in the participant list of the virtual meeting.

Figure 6:
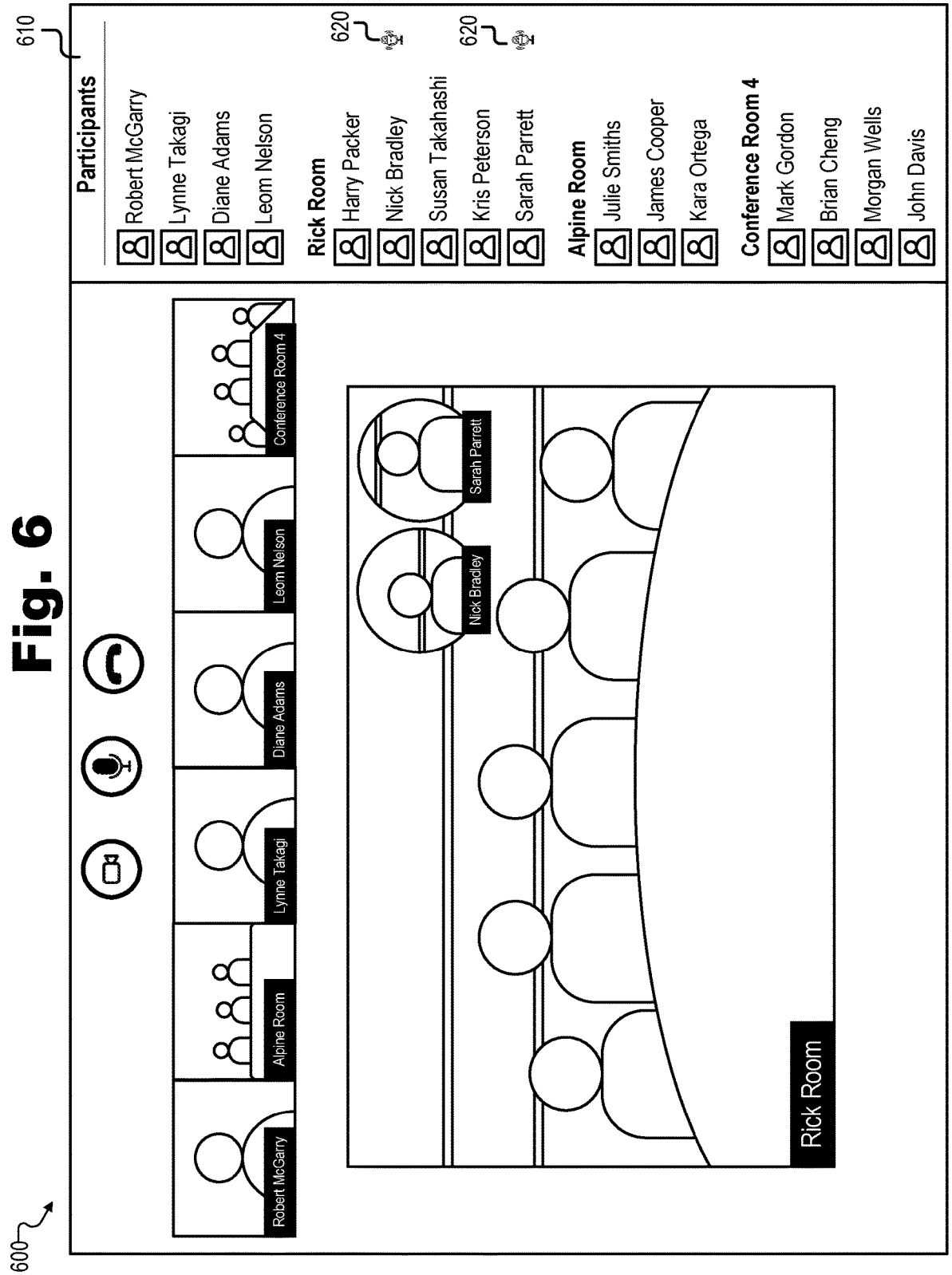

For example, FIG. 6 illustrates a virtual meeting interface 600 that includes a participant list 610 of the virtual meeting described above with reference to FIG. 4. As depicted in FIG. 6, participant list 610 may include participant identifiers (e.g., participant names) of one or more individual participants and a plurality of group participants in the virtual meeting. In some embodiments, the participant identifiers of the group participants may be aggregated in participant list 610 based on the physical locations 206 from which the group participants participate in the virtual meeting. For example, the group participants that have their user device 210 associated with the same physical location 206 may be grouped together to form a list of the group participants who participate in the virtual meeting from physical location 206. As depicted in FIG. 6, the list of group participants who participate in the virtual meeting from physical location 206 may be presented with the place identifier (e.g., the conference room name) of physical location 206 in participant list 610 of the virtual meeting. Accordingly, a participant of the virtual meeting may reference participant list 610 of the virtual meeting to learn which participants are present at each physical location 206 associated with the virtual meeting, based on their participant identifier (e.g., the participant name). Thus, participants of the virtual meeting no longer need to recognize the group participants who are present at a physical location 206 based solely on the video stream of physical location 206.

In some embodiments, when a group participant at a physical location 206 indicates that he or she plans on speaking and thereby identifying himself or herself as an active speaker of the virtual meeting, virtual meeting management system 100 may highlight the participant identifier (e.g., the participant name) of the group participant in participant list 610 of the virtual meeting to indicate that the group participant is an active speaker of the virtual meeting. For example, virtual meeting management system 100 may instruct a user interface component (e.g., the user interface component of user device 204 of each individual participant and the user interface devices of on-site conference system 208 at each physical location 206 of the virtual meeting) to highlight the participant identifier (e.g., the participant name) of the group participant in participant list 610 of the virtual meeting. In some embodiments, to highlight the participant identifier of the group participant in participant list 610, virtual meeting management system 100 may present an active speaker symbol 620 in association with the participant identifier of the group participant in participant list 610. For example, active speaker symbol 620 may be positioned in alignment with the participant identifier of the group participant (e.g., the participant name "Nick Bradley" of group participant 430, the participant name "Sarah Parrett" of group participant 432) in participant list 610 as depicted in FIG. 6. In some embodiments, for an active speaker who is an individual participant of the virtual meeting, the participant identifier (e.g., the participant name) of the individual participant in participant list 610 may be highlighted in a similar manner. Other implementations for highlighting a participant identifier of an active speaker in participant list 610 are also possible and contemplated.

Accordingly, the participant of the virtual meeting may reference participant list 610 and be informed of the participant identifiers (e.g., the participant names) of the active speakers in the virtual meeting based on the participant identifiers being highlighted in participant list 610. As described above, the active speakers of the virtual meeting may be individual participants and/or group participants. For the active speaker who is a group participant of the virtual meeting at a physical location 206, the participant identifier of the group participant may be presented in association with the place identifier (e.g., the conference room name) of the physical location 206 in participant list 610 as described herein. Accordingly, when referencing participant list 610, the participant of the virtual meeting may not only be informed of the participant identifier (e.g., the participant name) of the group participant who is an active speaker of the virtual meeting, but also be informed of the place identifier (e.g., the conference room name) of the physical location 206 that includes the group participant.

As described herein, when the group participant participates in the virtual meeting at physical location 206, user device 210 of the group participant may be associated with physical location 206 for the participant time during which the group participant participates in the virtual meeting. For example, to associate user device 210 of the group participant with physical location 206 that includes the group participant, management server 202 may map the device ID of user device 210 of the group participant to the place identifier of physical location 206 as described herein. Additionally or alternatively, management server 202 may assign a temporary ID to user device 210 of the group participant. The temporary ID may uniquely identify both user device 210 of the group participant and physical location 206 from which the group participant participates in the virtual meeting as described herein.

In some embodiments, virtual meeting management system 100 may determine that the group participant performs an action such as an interaction with one or more other participants of the virtual meeting using user device 210 of the group participant. In some embodiments, virtual meeting management system 100 may present the interaction of the group participant to the one or more other participants of the virtual meeting with the participant identifier (e.g., the participant name) of the group participant and the place identifier (e.g., a conference room name) of physical location 206 associated with the group participant. For example, virtual meeting management system 100 may provide the interaction of the group participant to a user interface component (e.g., the user interface component of user device 204 of each individual participant and the user interface devices of on-site conference system 208 at each physical location 206 of the virtual meeting) for presentation to the one or more other participants of the virtual meeting with the participant identifier (e.g., the participant name) of the group participant and the place identifier (e.g., a conference room name) of physical location 206 associated with the group participant.

For example, the group participant may use the virtual meeting application on user device 210 of the group participant to send a chat message, share a document, perform a raise-hand operation (e.g., provide a user input indicating that the group participant plans on speaking), and/or perform other interactions with the other participants in the virtual meeting. Thus, the group participant may electronically perform the interaction with the other participants during the virtual meeting without using on-site conference system 208 of physical location 206. In some embodiments, when the group participant performs the interaction, user device 210 of the group participant may transmit interaction data (e.g., a chat message, a shared document) associated with the interaction to management server 202. The interaction data may also include the device ID of user device 210 of the group participant and/or the temporary ID assigned to user device 210 of the group participant.

In some embodiments, when receiving the interaction data from user device 210 of the group participant, management server 202 may use the device ID of user device 210 and/or the temporary ID assigned to user device 210 that are included in the interaction data to determine the participant identifier (e.g., the participant name) of the group participant associated with user device 210 and also determine the place identifier (e.g., the conference room name) of physical location 206 that includes the group participant as described herein.

For example, management server 202 may identify the device ID of user device 210 included in the interaction data and/or specified by the temporary ID included in the interaction data. Management server 202 may then reference the device registration record using the device ID of user device 210, and determine the participant identifier (e.g., the participant name) of the group participant associated with user device 210. In some embodiments, management server 202 may also retrieve the mapping associated with the device ID of user device 210, and determine the place identifier (e.g., the conference room name) of physical location 206 that includes the group participant to be the place identifier being mapped to the device ID of user device 210. Additionally or alternatively, management server 202 may determine the place identifier specified by the temporary ID included in the interaction data, and determine the place identifier (e.g., the conference room name) of physical location 206 that includes the group participant to be the place identifier specified by the temporary ID.

In some embodiments, when the participant identifier (e.g., the participant name) of the group participant who performs the interaction using user device 210 and the place identifier (e.g., the conference room name) of physical location 206 that includes the group participant are determined, management server 202 may present the interaction of the group participant to the other participants in the virtual meeting interface together with the participant identifier (e.g., the participant name) of the group participant and the place identifier (e.g., the conference room name) of physical location 206 from which the group participant participates in the virtual meeting.

Figure 7:
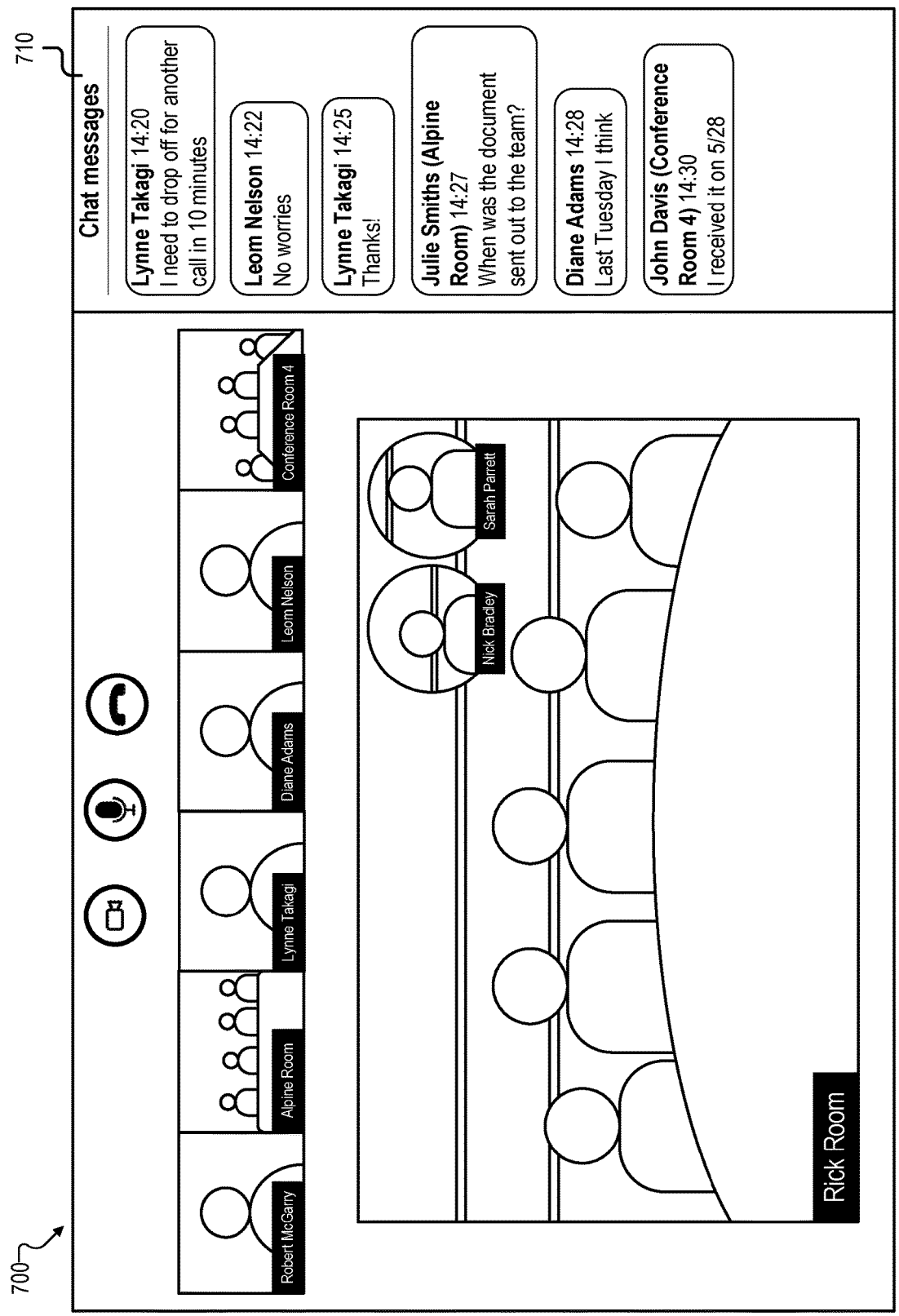

For example, FIG. 7 illustrates a virtual meeting interface 700 including a chat window 710 of the virtual meeting described above with reference to FIG. 4. Chat window 710 may include one or more chat messages being communicated between one or more participants (e.g., individual participants and/or group participants) of the virtual meeting. As depicted in FIG. 7, each chat message being sent from an individual participant of the virtual meeting may be presented in chat window 710 with only the participant identifier (e.g., the participant name) of the individual participant. On the other hand, each chat message being sent from a group participant participating in the virtual meeting at a physical location 206 may be presented in chat window 710 with the participant identifier (e.g., the participant name) of the group participant and the place identifier (e.g., the conference room name) of physical location 206. Accordingly, the participants of the virtual meeting may reference chat window 710 and be informed of the chat messages being sent by the individual participants of the virtual meeting and the chat messages being sent by the group participants of the virtual meeting. For each chat message being sent by a group participant of the virtual meeting, the participants of the virtual meeting may not only be informed of the participant identifier (e.g., the participant name) of the group participant but also be informed of the place identifier (e.g., the conference room name) of physical location 206 from which the group participant participates in the virtual meeting.

As described herein, when the group participant participates in the virtual meeting at physical location 206, user device 210 of the group participant may be associated with physical location 206 for the participant time during which the group participant participates in the virtual meeting. For example, the device ID of user device 210 of the group participant may be mapped to the place identifier of physical location 206 as described herein. Additionally or alternatively, user device 210 of the group participant may be assigned a temporary ID that uniquely identifies both user device 210 of the group participant and physical location 206. The temporary ID may be used in any communication to and from user device 210 of the group participant during the participation time of the group participant in the virtual meeting as described herein. In addition, when user device 210 of the group participant is associated with physical location 206, user device 210 of the group participant may operate in the association mode during the virtual meeting. As described herein, the association mode may include the user interface element (e.g., a selectable button) for the group participant to provide the user input indicating that the group participant will speak.

In some embodiments, virtual meeting management system 100 may determine that the group participant no longer participates in the virtual meeting. For example, management server 202 may determine that the group participant leaves the virtual meeting and/or determine that the virtual meeting is terminated. Accordingly, management server 202 may determine that the group participant no longer participates in the virtual meeting.

In some embodiments, in response to such determination, virtual meeting management system 100 may deactivate the association mode on user device 210 of the group participant. For example, management server 202 may instruct user device 210 of the group participant to deactivate the association mode on user device 210 of the group participant. When the association mode is deactivated, the user interface element (e.g., a selectable button) for the group participant to provide the user input indicating that the group participant will speak may be disabled on user device 210 of the group participant. As a result, the group participant may no longer be able to use the user interface element on user device 210 to identify himself or herself as an active speaker of the virtual meeting and thereby triggering the display of an active speaker indicator corresponding to the group participant in the virtual meeting interface.

In some embodiments, in addition to deactivating the association mode on user device 210 of the group participant, virtual meeting management system 100 may also dissociate user device 210 of the group participant and physical location 206 from which the group participant participates in the virtual meeting. In some embodiments, to dissociate user device 210 of the group participant and physical location 206, management server 202 may remove the mapping between user device 210 of the group participant and physical location 206. Additionally or alternatively, management server 202 may remove the temporary ID assigned to user device 210 of the group participant that uniquely identifies both user device 210 of the group participant and physical location 206. Thus, user device 210 of the group participant and physical location 206 including the group participant may be associated with one another during the entire participation time of the group participant in the virtual meeting. However, when the group participant no longer participates in the virtual meeting, the association between user device 210 of the group participant and physical location 206 may no longer exist.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 8:
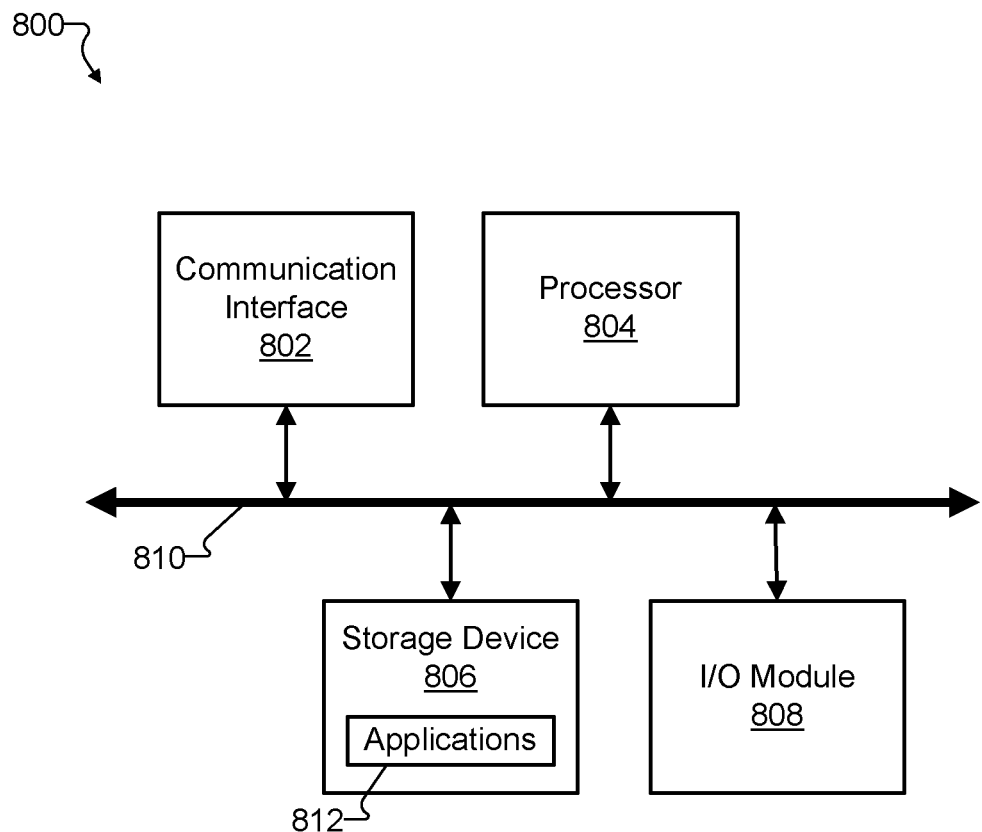
FIG. 8 shows an illustrative computing device according to embodiments described herein.

FIG. 8 shows an illustrative computing device 800 that may be specifically configured to perform one or more of the processes described herein. For example, computing device 800 may include or implement (or partially implement) a virtual meeting management system such as system 100, a user device such as user devices 204 and 210, a management server such as management server 202, an on-site conference system such as on-site conference system 208, and/or any other computing devices described herein.

As shown in FIG. 8, computing device 800 may include a communication interface 802, a processor 804, a storage device 806, and an input/output ("I/O") module 808 communicatively connected via a communication infrastructure 810. While an illustrative computing device 800 is shown in FIG. 8, the components illustrated in FIG. 8 are not intended to be limiting. Additional or alternative components may be used in other embodiments. Components of computing device 800 shown in FIG. 8 will now be described in additional detail.

Communication interface 802 may be configured to communicate with one or more computing devices. Examples of communication interface 802 include, without limitation, a wired network interface (such as a network interface card), a wireless network interface (such as a wireless network interface card), a modem, an audio/video connection, and any other suitable interface.

Processor 804 generally represents any type or form of processing unit capable of processing data or interpreting, executing, and/or directing execution of one or more of the instructions, processes, and/or operations described herein. Processor 804 may direct execution of operations in accordance with one or more applications 812 such as a virtual meeting management application or other computer-executable instructions such as instructions being stored in storage device 806 or another computer-readable medium.

Storage device 806 may include one or more data storage media, devices, or configurations and may employ any type, form, and combination of data storage media and/or device. For example, storage device 806 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 806. For example, data representative of one or more executable applications 812 configured to direct processor 804 to perform any of the operations described herein may be stored within storage device 806. In some examples, data may be arranged in one or more databases residing within storage device 806.

I/O module 808 may include one or more I/O modules configured to receive user input and provide user output. One or more I/O modules may be used to receive input for a single virtual experience. I/O module 808 may include any hardware, firmware, software, or combination thereof supportive of input and output capabilities. For example, I/O module 808 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 808 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 800. For example, one or more applications 812 residing within storage device 806 may be configured to direct processor 804 to perform one or more processes or functions associated with processor 104 of virtual meeting management system 100. Likewise, memory 102 of virtual meeting management system 100 may be implemented by or within storage device 806.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    associating, by a virtual meeting management system, a user device of a participant of a virtual meeting with a physical location from which the participant and one or more additional participants participate in the virtual meeting;
    determining, by the virtual meeting management system, that the participant provides a user input via the user device during the virtual meeting, the user input indicating that the participant will speak and comprising at least one of hand gesture input or a touch input;
    implementing, by the virtual meeting management system and based on the participant providing the user input indicating that the participant will speak, a voice detection component to begin listening for an utterance from the participant; and
    providing, by the virtual meeting management system based on the user input and the associating and while the voice detection component listens for the utterance, an active speaker indicator for presentation in a virtual meeting interface provided to one or more participants of the virtual meeting, the active speaker indicator specifying a participant identifier representative of the participant and a place identifier representative of the physical location from which the participant participates in the virtual meeting,
    wherein the providing of the active speaker indicator includes:
    generating, based on the participant providing the user input indicating that the participant will speak, a graphical element including the participant identifier of the participant and a video-only stream of the participant captured by the user device; and
    providing the graphical element for presentation in the virtual meeting interface, the graphical element provided for presentation together with a video-and-audio stream of the physical location captured by an on-site conference system of the physical location, the video-and-audio stream including the participant and the one or more additional participants.

2. The method of claim 1, further comprising: determining, by the virtual meeting management system based on the user input, the participant identifier representative of the participant, the participant identifier including a name of the participant; and determining, by the virtual meeting management system based on the associating between the user device of the participant and the physical location, the place identifier representative of the physical location from which the participant participates in the virtual meeting, the place identifier including a name of the physical location.

3. The method of claim 1, wherein the graphical element is overlaid on the video-and-audio stream of the physical location captured by the on-site conference system of the physical location.

4. The method of claim 1, further comprising:
instructing, by the virtual meeting management system, a user interface component to present the participant identifier of the participant in association with the place identifier of the physical location in a participant list of the virtual meeting; and
wherein the providing of the active speaker indicator for presentation includes instructing the user interface component to highlight the participant identifier of the participant in the participant list of the virtual meeting.

5. The method of claim 1, wherein the associating the user device of the participant with the physical location includes:
determining that the user device of the participant obtains an identifier presented at the physical location, the identifier being unique to the physical location and the virtual meeting; and
associating, in response to the determining that the user device of the participant obtains the identifier presented at the physical location, the user device of the participant with the physical location for a participation time of the participant in the virtual meeting.

6. The method of claim 1, wherein:
the identifier includes one or more of a Quick Response (QR) code, a barcode, or a string locally presented by an on-site conference system at the physical location.

7. The method of claim 1, further comprising:
activating, by the virtual meeting management system and in response to the associating of the user device of the participant with the physical location, an association mode on the user device for a participation time of the participant in the virtual meeting, wherein the association mode includes a user interface element for the participant to provide the user input indicating that the participant will speak.

8. The method of claim 1, further comprising:
determining, by the virtual meeting management system, that the participant no longer participates in the virtual meeting;
deactivating, by the virtual meeting management system and in response to the determining that the participant no longer participates in the virtual meeting, an association mode on the user device; and
dissociating, by the virtual meeting management system and in response to the determining that the participant no longer participates in the virtual meeting, the user device of the participant and the physical location.

9. The method of claim 1, further comprising:
determining, by the virtual meeting management system, that the participant performs an interaction with one or more other participants of the virtual meeting using the user device; and
providing, by the virtual meeting management system, the interaction of the participant for presentation to the one or more other participants with the participant identifier of the participant and the place identifier of the physical location associated with the participant.

10. The method of claim 1, further comprising:
detecting, by the virtual meeting management system, that the participant has not spoken during a predefined time period subsequent to the user input; and
instructing, by the virtual meeting management system and based on the detecting, a user interface component to remove the active speaker indicator corresponding to the participant from the virtual meeting interface.

11. The method of claim 10, wherein:
the detecting that the participant has not spoken during the predefined time period is based on a machine learning model implemented on the user device and configured to detect an utterance of the participant.

12. A system comprising a processor configured to:
associate a user device of a participant of a virtual meeting with a physical location from which the participant and one or more additional participants participate in the virtual meeting;
determine that the participant provides a user input via the user device during the virtual meeting, the user input indicating that the participant will speak and comprising at least one of a hand gesture input or a touch input;
implementing, based on the participant providing the user input indicating that the participant will speak, a voice detection component to begin listening for an utterance from the participant; and
provide, based on the user input and the associating and while the voice detection component listens for the utterance, an active speaker indicator for presentation in a virtual meeting interface provided to one or more participants of the virtual meeting, the active speaker indicator specifying a participant identifier representative of the participant and a place identifier representative of the physical location from which the participant participates in the virtual meeting,
wherein the providing of the active speaker indicator includes:
generating, based on the participant providing the user input indicating that the participant will speak, a graphical element including the participant identifier of the participant and a video-only stream of the participant captured by the user device; and
providing the graphical element for presentation in the virtual meeting interface, the graphical element provided for presentation together with a video-and-audio stream of the physical location captured by an on-site conference system of the physical location, the video-and-audio stream including the participant and the one or more additional participants.

13. The system of claim 12, wherein the processor is further configured to:
determine, based on the user input, the participant identifier representative of the participant, the participant identifier including a name of the participant; and
determine, based on the associating between the user device of the participant and the physical location, the place identifier representative of the physical location from which the participant participates in the virtual meeting, the place identifier including a name of the physical location.

14. The system of claim 12, wherein the graphical element is overlaid on the video-and-audio stream of the physical location captured by the on-site conference system of the physical location.

15. The system of claim 12, wherein the associating the user device of the participant with the physical location includes:
   determining that the user device of the participant obtains an identifier presented at the physical location, the identifier being unique to the physical location and the virtual meeting; and
   associating, in response to the determining that the user device of the participant obtains the identifier presented at the physical location, the user device of the participant with the physical location for a participation time of the participant in the virtual meeting.

16. The system of claim 12, wherein the processor is further configured to:
   activate, in response to the associating of the user device of the participant with the physical location, an association mode on the user device for a participation time of the participant in the virtual meeting, wherein the association mode includes a user interface element for the participant to provide the user input indicating that the participant will speak.

17. The system of claim 12, wherein the processor is further configured to:
   determine that the participant no longer participates in the virtual meeting;
   deactivate, in response to the determining that the participant no longer participates in the virtual meeting, an association mode on the user device; and
   dissociate, in response to the determining that the participant no longer participates in the virtual meeting, the user device of the participant and the physical location.

18. The system of claim 12, wherein the processor is further configured to:
   determine that the participant performs an interaction with one or more other participants of the virtual meeting using the user device; and
   provide the interaction of the participant for presentation to the one or more other participants with the participant identifier of the participant and the place identifier of the physical location associated with the participant.

19. The system of claim 12, wherein the processor is further configured to:
   detect that the participant has not spoken during a predefined time period subsequent to the user input; and
   instruct, based on the detecting, a user interface component to remove the active speaker indicator corresponding to the participant from the virtual meeting interface.

20. A non-transitory computer-readable medium storing instructions that, when executed, direct a processor of a virtual meeting management system to:
   associate a user device of a participant of a virtual meeting with a physical location from which the participant and one or more additional participants participate in the virtual meeting;
   determine that the participant provides a user input via the user device during the virtual meeting, the user input indicating that the participant will speak and comprising at least one of a hand gesture input or a touch input;
   implement, based on the participant providing the user input indicating that the participant will speak, a voice detection component to begin listening for an utterance from the participant; and
   provide, based on the user input and the associating and while the voice detection component listens for the utterance, an active speaker indicator for presentation in a virtual meeting interface provided to one or more participants of the virtual meeting, the active speaker indicator specifying a participant identifier representative of the participant and a place identifier representative of the physical location from which the participant participates in the virtual meeting,
   wherein the providing of the active speaker indicator includes:
   generating, based on the participant providing the user input indicating that the participant will speak, a graphical element including the participant identifier of the participant and a video-only stream of the participant captured by the user device; and
   providing the graphical element for presentation in the virtual meeting interface, the graphical element provided for presentation together with a video-and-audio stream of the physical location captured by an on-site conference system of the physical location, the video-and-audio stream including the participant and the one or more additional participants.

* * * * *